United States Patent
Yang et al.

(10) Patent No.: US 11,157,024 B2
(45) Date of Patent: Oct. 26, 2021

(54) RIGID-FLEXIBLE COUPLING MOTION PLATFORM DRIVEN BY BALL SCREW AND CONTROL METHOD THEREOF

(71) Applicant: Guangdong University of Technology, Guangzhou (CN)

(72) Inventors: Zhijun Yang, Guangzhou (CN); Qian Li, Guangzhou (CN); Hao Peng, Guangzhou (CN); Youdun Bai, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 225 days.

(21) Appl. No.: 16/558,207

(22) Filed: Sep. 2, 2019

(65) Prior Publication Data
US 2020/0192407 A1    Jun. 18, 2020

(30) Foreign Application Priority Data
Dec. 13, 2018  (CN) .......................... 201811526298.4

(51) Int. Cl.
*G05D 3/12*    (2006.01)
*F16H 25/22*    (2006.01)
(Continued)

(52) U.S. Cl.
CPC ........... *G05D 3/12* (2013.01); *F16H 25/2204* (2013.01); *G05B 19/40* (2013.01); *G05D 13/62* (2013.01);
(Continued)

(58) Field of Classification Search
CPC ........... F16H 25/2204; F16H 2025/204; F16H 2025/2081; G05D 3/12; G05D 13/62;
(Continued)

(56) References Cited

U.S. PATENT DOCUMENTS

| 5,053,685 A | * | 10/1991 | Bacchi | ................. G05B 19/232 |
| | | | | 318/135 |
| 2015/0040701 A1 | * | 2/2015 | Shimomura | ........ F16H 25/2214 |
| | | | | 74/89.23 |

(Continued)

FOREIGN PATENT DOCUMENTS

CN    106002312 A    10/2016
CN    107538042 A    1/2018

*Primary Examiner* — David M Fenstermacher
(74) *Attorney, Agent, or Firm* — True Shepherd LLC; Andrew C. Cheng (57) ABSTRACT

A rigid-flexible coupling motion platform driven by a ball screw includes a base, a linear guide rail fixed to the base, a rigid-flexible coupling platform, a servo motor, a ball screw, a guide rail sliding block, a displacement sensor and a driving controller. The rigid-flexible coupling platform includes a frame and a workbench. The frame and the workbench are connected through a flexible hinge; the servo motor is configured to drive the ball screw; the workbench is connected with the ball screw; the frame is connected with the linear guide rail by the guide rail sliding block; the displacement sensor is configured to feed back the position of the workbench; and the driving controller controls the ball screw to drive the workbench to move according to different control modes. The advantages of the ball screw drive and the rigid-flexible coupling motion platform are fully combined, and the positioning precision of the platform is greatly improved.

6 Claims, 7 Drawing Sheets

(51) Int. Cl.
*G05B 19/40* (2006.01)
*G05D 13/62* (2006.01)
*F16H 25/20* (2006.01)

(52) U.S. Cl.
CPC .............. *F16H 2025/204* (2013.01); *F16H 2025/2081* (2013.01); *G05B 2219/42054* (2013.01); *G05B 2219/43175* (2013.01)

(58) Field of Classification Search
CPC .......... G05B 19/40; G05B 2219/42054; G05B 2219/43175
See application file for complete search history.

(56) References Cited

U.S. PATENT DOCUMENTS

| | | | |
|---|---|---|---|
| 2015/0377330 A1* | 12/2015 | Mori | F16H 25/2214 74/89.44 |
| 2016/0015890 A1 | 1/2016 | Dassau et al. | |
| 2016/0116033 A1* | 4/2016 | Yamakura | F16C 29/063 74/424.89 |
| 2016/0288319 A1* | 10/2016 | Kfoury | B25J 9/104 |
| 2017/0009857 A1* | 1/2017 | Garrec | F16H 19/06 |
| 2017/0130809 A1* | 5/2017 | Rath | F16H 25/20 |
| 2017/0198790 A1* | 7/2017 | Ungar | B64C 9/22 |
| 2017/0298984 A1* | 10/2017 | Nakayama | F16C 29/002 |
| 2018/0010477 A1 | 1/2018 | Stewart et al. | |
| 2018/0112707 A1* | 4/2018 | Matsumoto | F16C 33/3713 |
| 2018/0266530 A1* | 9/2018 | Alfano | H02K 5/225 |
| 2018/0291999 A1* | 10/2018 | Homma | F16C 29/0623 |
| 2018/0292294 A1* | 10/2018 | Yamada | G01M 13/04 |
| 2019/0063570 A1* | 2/2019 | Ota | F16H 25/24 |
| 2019/0093750 A1* | 3/2019 | Matsuto | F16H 57/021 |
| 2019/0107186 A1* | 4/2019 | Feitl | F16D 1/092 |
| 2019/0361467 A1* | 11/2019 | Fujita | G05D 3/12 |
| 2019/0368583 A1* | 12/2019 | Higuchi | F16H 25/20 |
| 2020/0309238 A1* | 10/2020 | Homma | F16C 29/063 |
| 2020/0398389 A1* | 12/2020 | Cherpurny | B23Q 1/015 |
| 2021/0116018 A1* | 4/2021 | Vermande | F16H 57/0464 |
| 2021/0140522 A1* | 5/2021 | Lee | F16H 25/2214 |

* cited by examiner

RIGID-FLEXIBLE COUPLING MOTION PLATFORM DRIVEN BY BALL SCREW AND CONTROL METHOD THEREOF

CROSS-REFERENCE TO RELATED APPLICATIONS

This application claims priority to Chinese Patent Application No. 201811526298.4 with a filing date of Dec. 13, 2018. The content of the aforementioned application, including any intervening amendments thereto, are incorporated herein by reference.

TECHNICAL FIELD

The disclosure relates to a motor driving technology, and more particularly relates to a rigid-flexible coupling motion platform driven by a ball screw and a control method thereof.

BACKGROUND OF THE PRESENT INVENTION

Most of the existing platforms driven by a ball screw are highly rigid platforms, which cannot achieve high precision due to the existence of friction dead zones. The existing rigid-flexible coupling motion platforms are driven by a linear motor. Although the problem of the friction dead zones of the rigid platforms is solved, due to low frequency of a flexible hinge, it is easy to cause vibration when the linear motor moves at a high speed, which affects the increase of the overall speed of the platforms.

SUMMARY OF PRESENT INVENTION

A rigid-flexible coupling motion platform driven by a ball screw proposed by the disclosure utilizes the advantage of driving without vibration in the ball screw, and combines the elastic deformation of the rigid-flexible coupling motion platform to compensate for the problem of a friction dead zone. Due to the disturbance problem caused by ball screw clearance and load change, a servo motor and a displacement sensor are respectively used as a speed loop and a position loop to form a dual-feedback mode to improve the accuracy of the system; a theoretical driving displacement of the servo motor and an actual displacement of the position sensor form a difference; and the disturbance is estimated and compensated by an auto disturbance rejection control mode to improve the dynamic performance and load and gap change disturbance of the system. The advantages of the ball screw drive and the rigid-flexible coupling motion platform are fully combined, and the positioning precision of the platform is greatly improved on the premise of using the traditional mechanical guide rail and not increasing the cost. A specific technical solution is as follows.

A rigid-flexible coupling motion platform driven by a ball screw is provided. The rigid-flexible coupling motion platform includes a base, a linear guide rail fixed to the base, a rigid-flexible coupling platform, a servo motor, a ball screw, a guide rail sliding block, a displacement sensor and a driving controller; the rigid-flexible coupling platform includes a frame and a workbench; and the frame and the workbench are connected through a flexible hinge. The servo motor is configured to drive the ball screw; the workbench is connected with the ball screw; the frame is connected with the linear guide rail by the guide rail sliding block; the displacement sensor is configured to feed back the position of the workbench; the driving controller is configured to take a planned trajectory as a control target, to form a position loop with the position feedback of the workbench; and to form a speed loop with a speed of the servo motor, and a control signal is input to a current loop to drive the ball screw to drive the workbench to move.

A rigid-flexible coupling motion platform driven by a ball screw is provided. The rigid-flexible coupling motion platform includes a base, a linear guide rail fixed to the base, a rigid-flexible coupling platform, a servo motor, a ball screw, a guide rail sliding block, a displacement sensor and a driving controller; the rigid-flexible coupling platform includes a frame and a workbench; and the frame and the workbench are connected through a flexible hinge. The servo motor is configured to drive the ball screw; the workbench is connected with the ball screw; the frame is connected with the linear guide rail by the guide rail sliding block; the displacement sensor is configured to feed back the position of the workbench; and the driving controller is configured to take a planned trajectory as a control target, to form a position loop with the position feedback of the workbench, and to form a speed loop with a speed of the servo motor, with a purpose of converting the position of the servo motor into a linear displacement, the position feedback of the workbench is serviced as an actual position, a position deviation and a control signal are taken as inputs to perform the expanded state observation of disturbance estimation, and the estimated disturbance is used to modify the control signal; and a control signal is generated to a current loop to drive the ball screw to drive the workbench to move.

Further, the flexible hinge is a spring leaf; the workbench and the spring leaf are connected together by a middle pressing block; and both ends of the spring leaf are pressed together with the frame through two end pressing blocks respectively; the middle pressing block is replaceable with a pressing block of a different width; and pressing positions of the end pressing blocks are changeable.

A method for controlling a rigid-flexible coupling motion platform driven by a ball screw is provided. The rigid-flexible coupling motion platform includes a base, a linear guide rail fixed to the base, a rigid-flexible coupling platform, a servo motor, a ball screw, a guide rail sliding block, a displacement sensor and a driving controller; the rigid-flexible coupling platform includes a frame and a workbench; the frame and the workbench are connected through a flexible hinge; the servo motor is configured to drive the ball screw; the workbench is connected with the ball screw; the frame is connected with the linear guide rail by the guide rail sliding block; the displacement sensor is configured to feed back the position of the workbench; and the driving controller is configured to control the ball screw to drive the workbench to move. The method includes: a semi-closed loop control mode, a dual-feedback full-closed loop control mode, and a dual-feedback auto disturbance rejection control mode; in the semi-closed loop control mode, a planned trajectory is taken as a control target, a position loop is formed with the position feedback of the servo motor, a speed loop is formed with a speed of the servo motor, and a control signal is input to a current loop to drive the ball screw to drive the workbench to move; in the dual-feedback full-closed loop control mode, a planned trajectory is taken as a control target, a position loop is formed with the position feedback of the workbench, a speed loop is formed with a speed of the servo motor, and a control signal is input to a current loop to drive the ball screw to drive the workbench to move; in the dual-feedback auto disturbance rejection control mode, a planned trajectory is taken as a control target, a position loop is formed with the position feedback of the workbench, a speed loop is formed with a speed of the servo motor, with a purpose of converting the position of the servo motor into a linear displacement, the position feedback of the workbench is serviced as an actual position, a position deviation and a control signal are taken as inputs to perform the expanded state observation of disturbance estimation, and the estimated disturbance is used to modify the control signal; and then the control signal is input to a current loop to drive the ball screw to drive the workbench to move.

Further, when precision is required in micron scale, the semi-closed loop control mode is adopted; when precision is required in sub-micron scale, the dual-feedback full-closed loop control mode is adopted; and when precision is required in nanoscale, the dual-feedback auto disturbance rejection control mode is adopted.

Further, in the micron scale, the precision is greater than 1 μm; in the sub-micron scale, the precision is in a range of 0.1-1 μm; and in the nanoscale, the precision is less than 0.1 μm.

Compared with the prior art, the disclosure has the following beneficial effects:

1. Traditional ball screw motion platforms are highly rigid platforms. Since the guide rail has a friction dead zone, the platform is elastically deformed before the friction is overcome, so that high precision cannot be achieved. The disclosure adopts a ball screw and a rigid-flexible coupling platform structure, utilizes the elastic deformation of the flexible hinge to compensate for the friction dead zone of the ball screw, and performs full closed-loop feedback through a displacement detection sensor, so that the platform achieves higher positioning precision.

2. The rigid-flexible coupling platform uses two sets of flexible hinge structures to form a sandwich structure, wherein the workbench and the frame are connected through flexible hinges on both sides, and are integrally processed to avoid generating assembly errors between a macro platform and a micro platform. The flexible hinges on both ends are made of spring steel, thereby ensuring the overall fatigue life of the flexible hinges.

3. The spring type flexible hinges at both ends can adjust the rigidity through their effective length, so that the platform can meet the use requirements under different working conditions.

4. The displacement sensor is installed on the platform, and the full-closed loop feedback is realized, so that the platform can achieve higher positioning precision.

5. The position feedback is performed by the displacement sensor; the servo motor performs speed feedback; and the dual feedback ensures that the platform has higher positioning precision.

6. The feedback of a servo motor encoder is divided by weekly pulse count, and the obtained quotient is multiplied by the lead of the ball screw and converted into linear motion information as an ideal target. A difference between the linear motion information and a displacement obtained by the displacement sensor is calculated to obtain a displacement deviation. Disturbance estimation and compensation are carried out using an extended state observer with an auto disturbance rejection algorithm.

DETAILED DESCRIPTION OF PREFERRED EMBODIMENTS

The drawings are merely used for exemplary illustration, and shall not be understood as a limitation to the disclosure. In order to better illustrate the embodiments, some components in the drawings may be omitted, enlarged or reduced, and do not represent the actual product sizes. It can be understood for those of ordinary skill in the art that some known structures in the drawings and the description may be omitted. The positional relationship described in the drawings is merely used for exemplary illustration, and shall not be understood as a limitation to the disclosure.

Embodiment I

Figure 1:
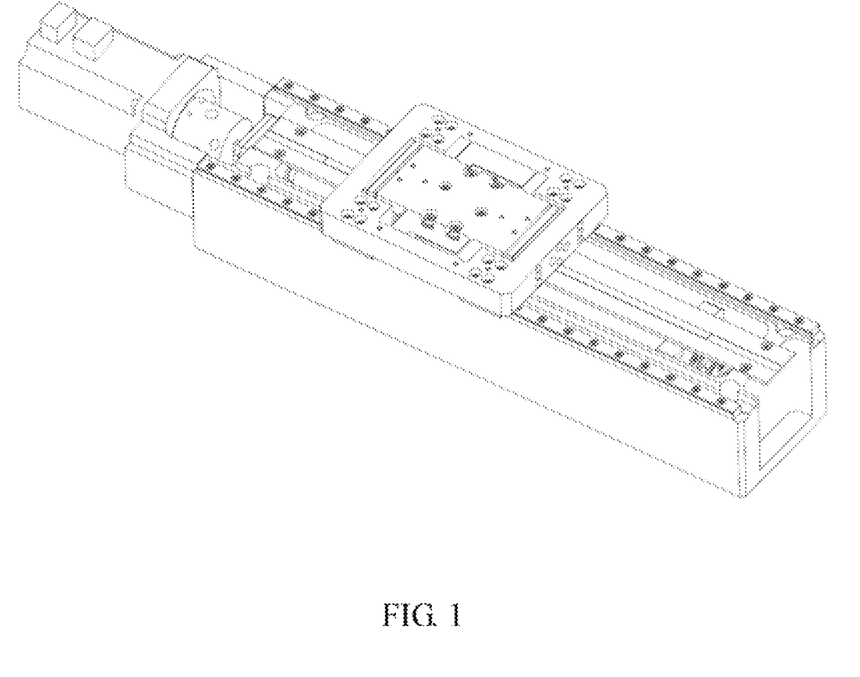
FIG. 1 is an overall schematic diagram of a rigid-flexible coupling motion platform driven by a ball screw.
Figure 2:
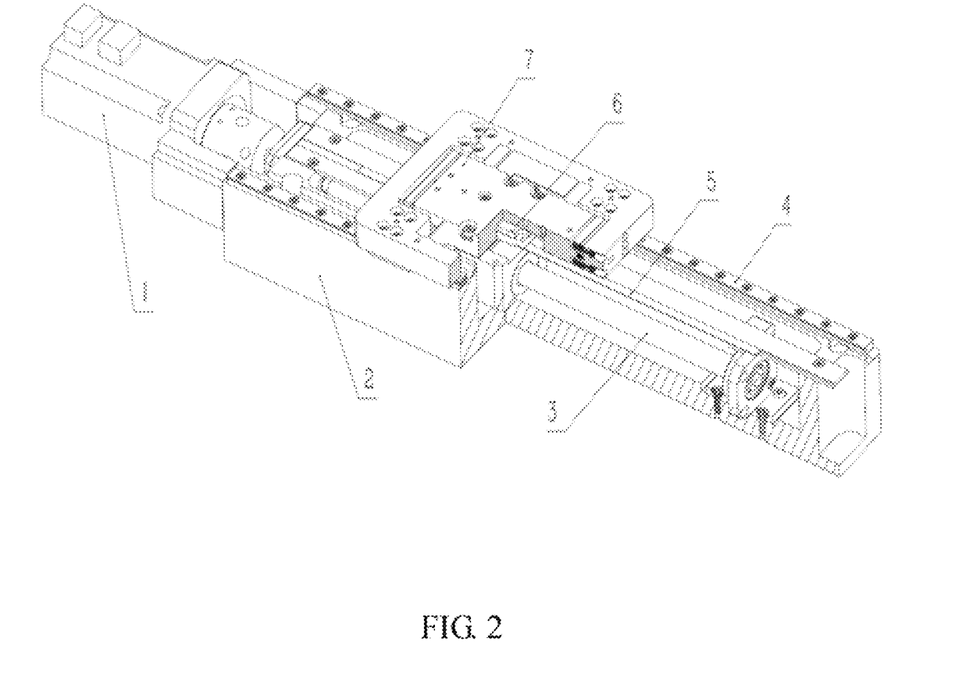
FIG. 2 is a local sectional view of a rigid-flexible coupling motion platform driven by a ball screw.
Figure 3:
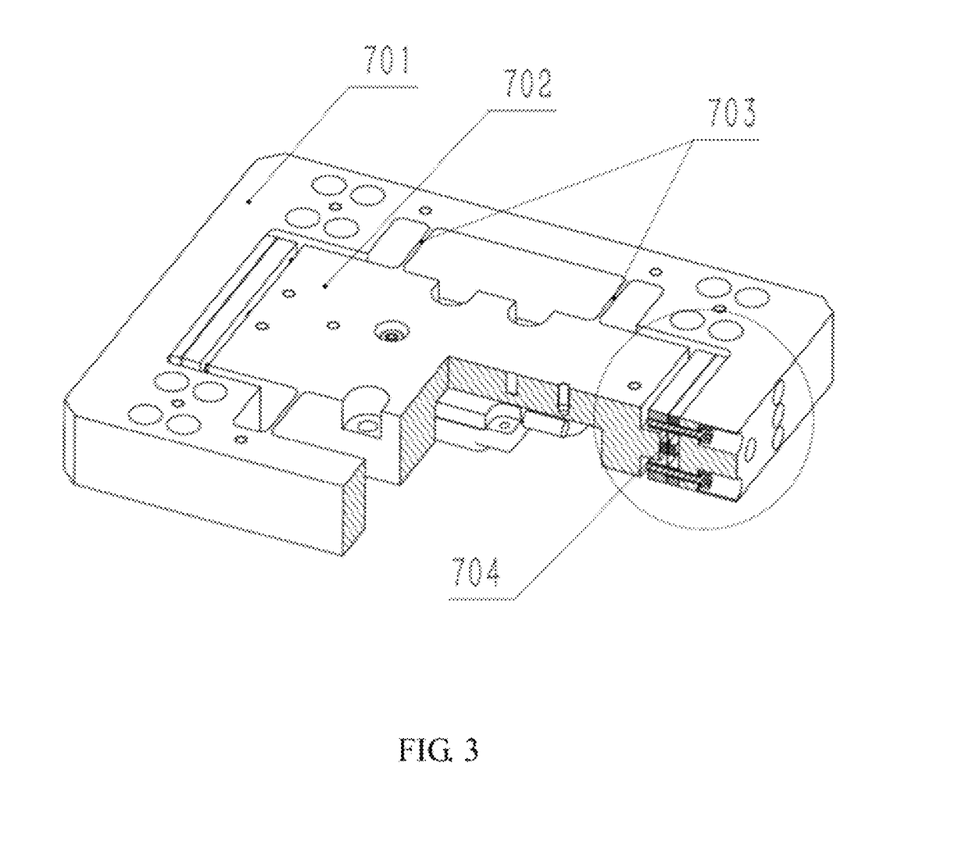
FIG. 3 is a local sectional view of a rigid-flexible coupling platform.

As shown in FIG. 1 and FIG. 2, a rigid-flexible coupling motion platform driven by a ball screw in the disclosure includes a base 2, a linear guide rail 4, a rigid-flexible coupling platform 7, a servo motor 1, a ball screw 3, a displacement sensor and a driving controller. A frame 701 and a workbench 702 jointly form the rigid-flexible coupling platform 7 through composite flexible hinges 703 and 704. The servo motor 1 is configured to drive the ball screw 3. The ball screw 3 is connected with the workbench 702 in the rigid-flexible coupling platform 7 through a bolt. The frame 701 in the rigid-flexible coupling platform 7 is connected with the linear guide rail 4 by a sliding block. The frame 701 is connected with the sliding block, and slides on the linear guide rail 4 through the sliding block. The displacement sensor includes a displacement sensor reading head 6 and a displacement sensor substrate 5. The displacement sensor reading head 6 is installed on the workbench 702 through a bolt. The displacement sensor substrate 5 is installed on the base 2. The servo motor 1, the ball screw 3 and the linear guide rail 4 are fixed to the base 2 through bolts. The ball screw is driven by the servo motor 1; the ball screw drives the workbench in the rigid-flexible coupling platform 7 to move; and the workbench 702 drives the frame 701 through composite flexible hinges to move on the linear guide rail 4.

Figure 4:
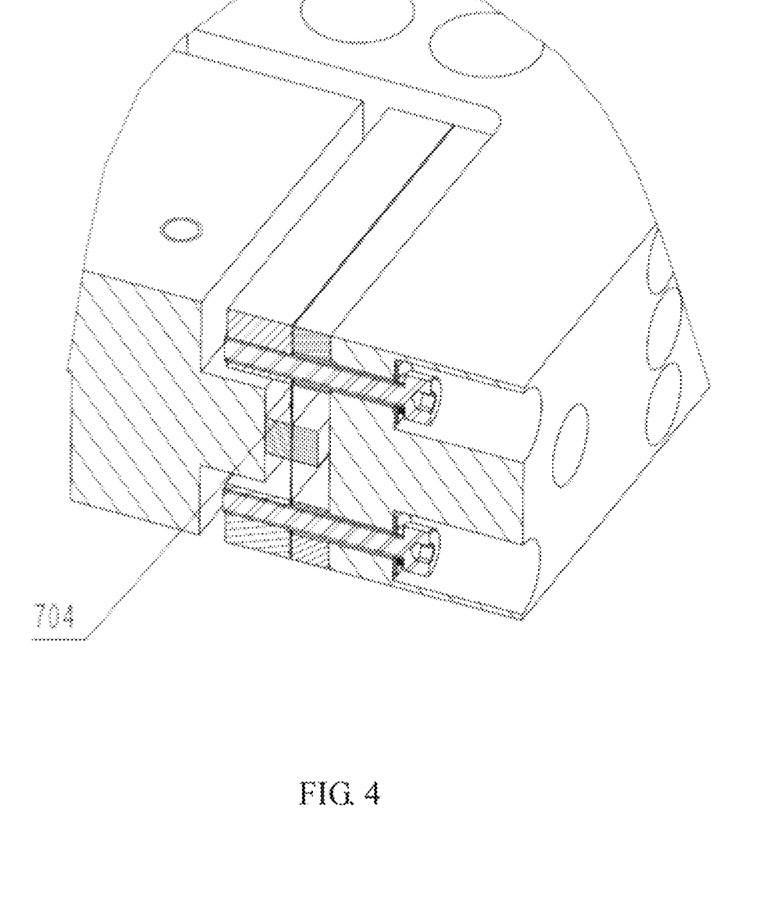
FIG. 4 is a local enlarged diagram of a composite flexible hinge in a rigid-flexible coupling platform.

As shown in FIG. 4, the effective length of the flexible hinge 704 is changed by replacing the middle pressing block of a different width for a spring leaf type elastic hinge 704 or adjusting the positions of the pressing blocks at both ends, thereby changing the rigidity of the rigid-flexible coupling platform and adapting to needs under different working conditions.

Figure 5:
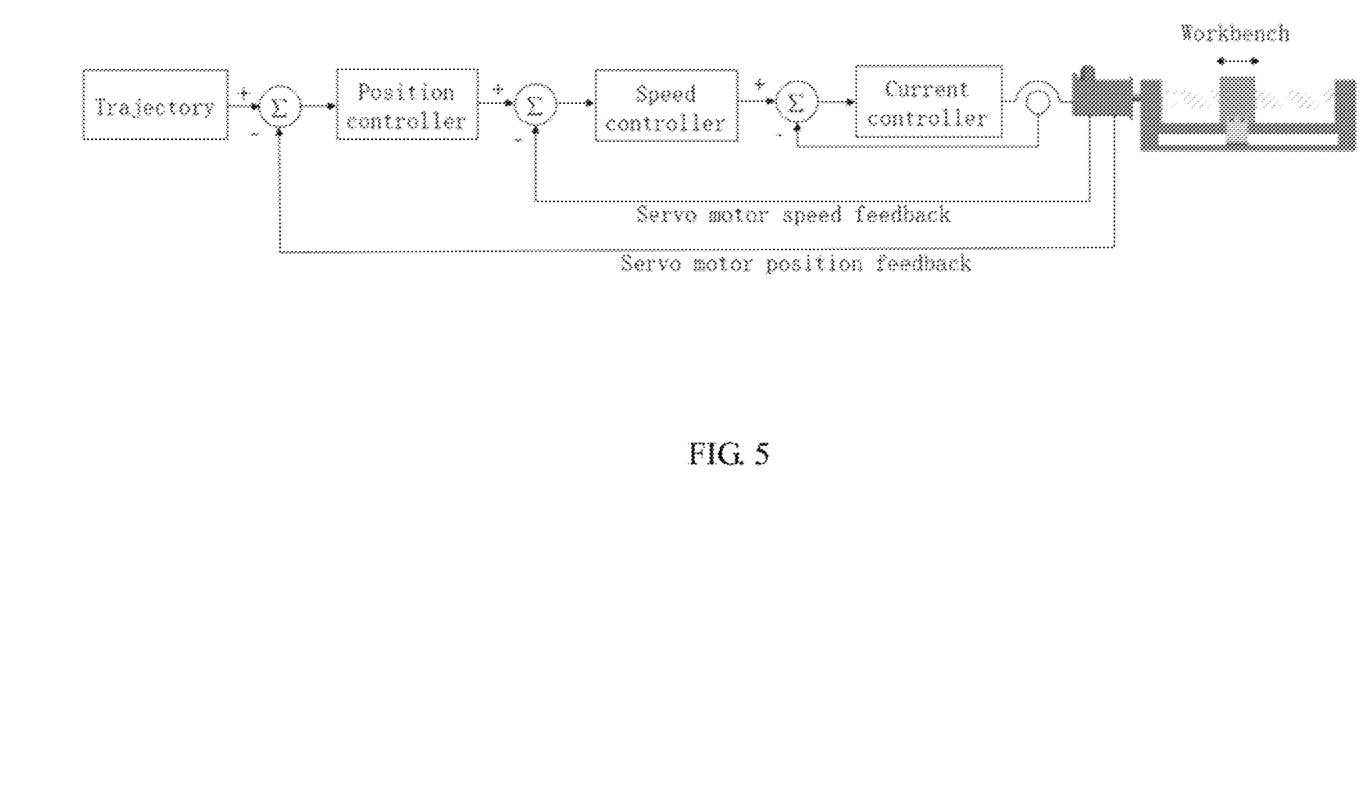
FIG. 5 shows a semi-closed loop control mode of a rigid-flexible coupling platform driven by a ball screw.

FIG. 5 shows a semi-closed loop control mode in which servo motor speed feedback is used to form a speed loop and servo motor displacement feedback is used to form a position loop. A planned trajectory is taken as a control target, a position loop is formed with the position feedback of the servo motor, a speed loop is formed with a speed of the servo motor, and a control signal is generated to a current loop to drive the ball screw to drive the workbench to move. When the displacement is small and a support reaction generated by the elastic deformation of the flexible hinge is insufficient to overcome the friction, the friction dead zone is completely compensated by the elastic deformation, thereby greatly improving the precision. When a stroke is large, the support reaction of the flexible hinge is greater than the friction force, so as to drive the frame to move to achieve a wide range of motion. The precision of the ball screw platform is improved through mechanism design without increasing the control cost.

The semi-closed loop control mode is the most economical and is suitable for use when the precision is not required to be high, i.e., in micron scale (e.g., greater than 1 μm).

Embodiment II

Like embodiment I. Embodiment II also uses the rigid-flexible coupling motion platform driven by the ball screw, but adopts a different control mode. The control mode of embodiment II is a dual-feedback full-closed loop control mode.

Figure 6:
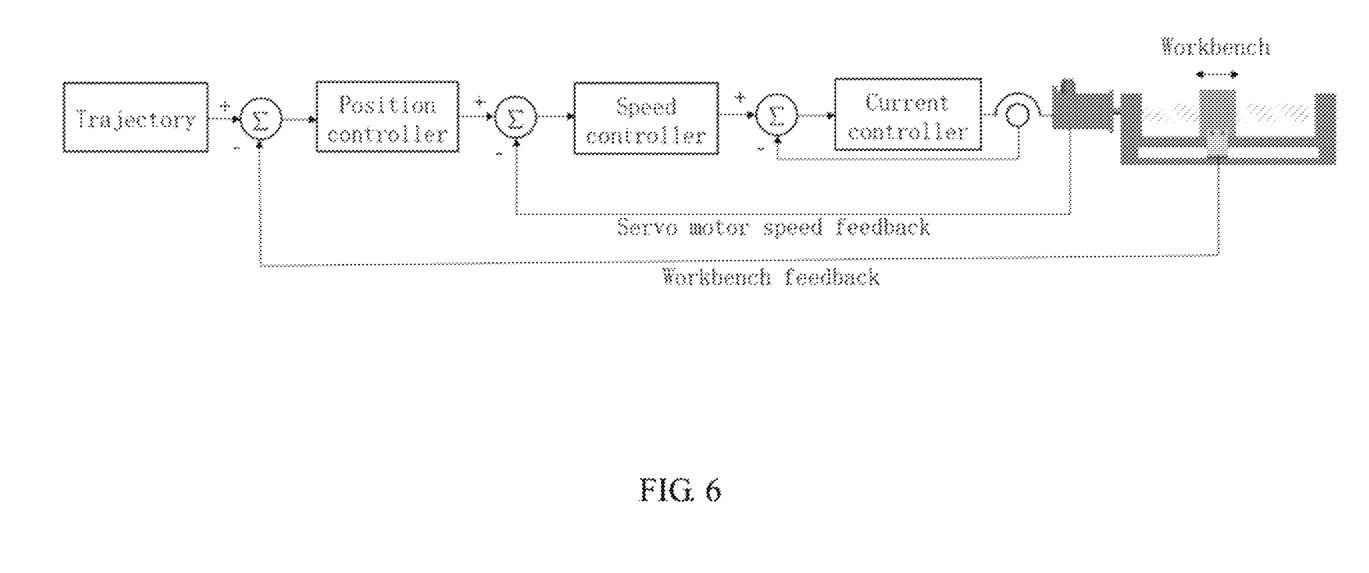
FIG. 6 shows a dual-feedback control mode of a rigid-flexible coupling platform driven by a ball screw.

FIG. 6 shows a full-closed loop control mode in which servo motor speed feedback is used to form a speed loop and servo motor displacement feedback is used to form a position loop. A planned trajectory is taken as a control target, a position loop is formed with the position feedback of the workbench, a speed loop is formed with a speed of the servo motor, and a control signal is generated to a current loop to drive the ball screw to drive the workbench to move. When the displacement is small and a support reaction generated by the elastic deformation of the flexible hinge is insufficient to overcome the friction, the friction dead zone is completely compensated by the elastic deformation, thereby greatly improving the precision. When a stroke is large, the support reaction of the flexible hinge is greater than the friction force, so as to drive the frame to move to achieve a wide range of motion. The precision of the rigid-flexible coupling platform driven by the ball screw is further improved by full-closed loop control.

The dual-feedback full-closed loop control mode in embodiment II is more suitable for use when the precision is required to be high, i.e., in sub-micron scale (e.g., 0.1-1 μm).

Embodiment III

Like embodiment I, Embodiment III also uses the rigid-flexible coupling motion platform driven by the ball screw, but adopts a different control mode. The control mode of embodiment III is a dual-feedback auto disturbance rejection control mode.

Figure 7:
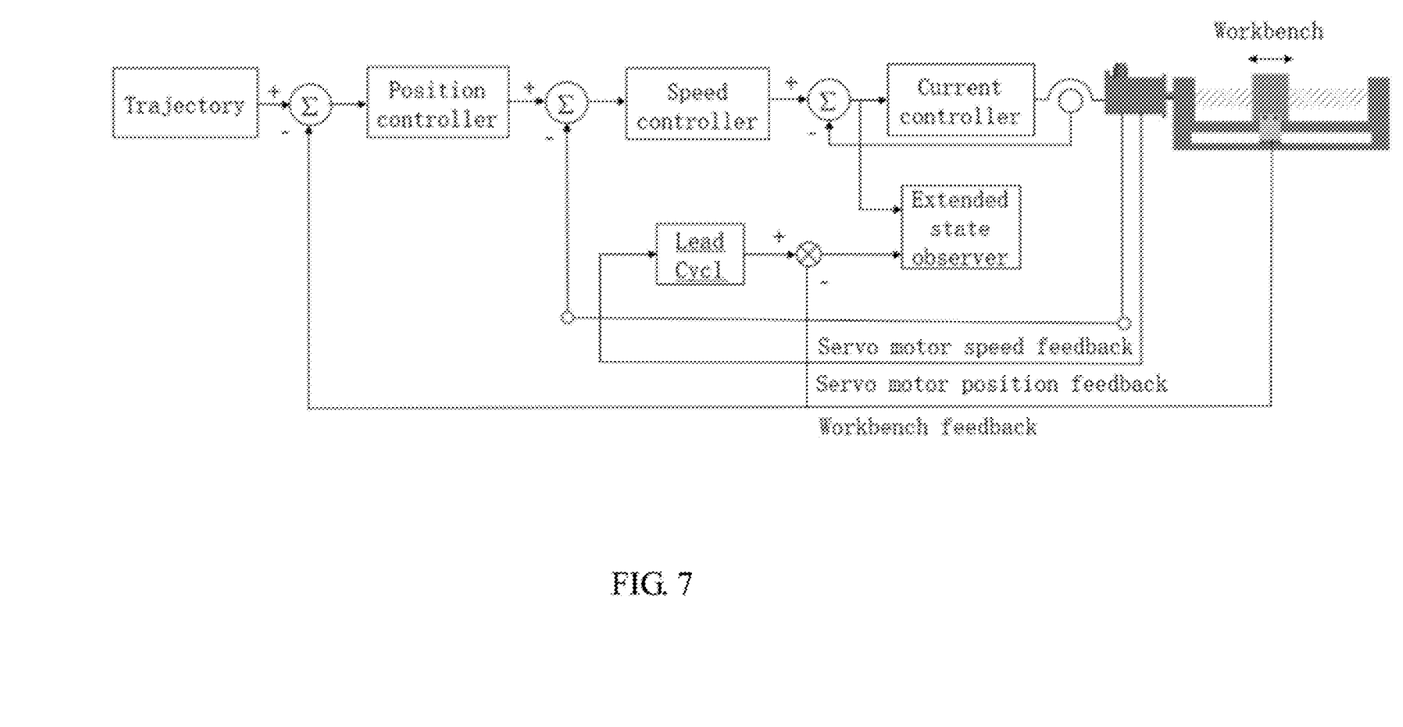
FIG. 7 shows a dual-feedback auto disturbance rejection control mode of a rigid-flexible coupling platform driven by a ball screw.

FIG. 7 shows a realization mode for performing expanded state observation of disturbance estimation and compensating for estimated disturbance by taking an objective of converting a position of a servo motor into a linear displacement, taking a position feedback of a workbench as an actual position and taking a position deviation and a control signal as inputs.

A planned trajectory is taken as a control target, a position loop is formed with the position feedback of the workbench, and a speed loop is formed with the speed of the servo motor. With a purpose of converting the position of the servo motor into a linear displacement, the position feedback of the workbench is serviced as an actual position, a position deviation and a control signal are taken as inputs to perform the expanded state observation of disturbance estimation, and the estimated disturbance is used to modify the control signal. The control signal is input to a current loop to drive the ball screw to drive the workbench to move. When the displacement is small and a support reaction generated by the elastic deformation of the flexible hinge is insufficient to overcome the friction, the friction dead zone is completely compensated by the elastic deformation, thereby greatly improving the precision. When a stroke is large, the support reaction of the flexible hinge is greater than the friction force, so as to drive the frame to move to achieve a wide range of motion. The auto disturbance rejection algorithm is introduced, which not only improves dynamic performance, but also adapts to load change.

The dual-feedback auto disturbance rejection control mode in embodiment III is more suitable for use when the precision is required to be very high, i.e., in nanoscale (e.g., less than 0.1 μm).

It is apparent that the above embodiments of the disclosure are merely examples made for clearly describe the disclosure and are not intended to limit the embodiments of the disclosure. Other variations or modifications of the different forms may be made based on the above illustration by those of ordinary skill in the art. There is no need and no way to enumerate all of the embodiments herein. Any modification, equivalent substitution and improvement made within the spirit and principle of the disclosure shall be included within the protection scope of the claims.

We claim:

1. A rigid-flexible coupling motion platform driven by a ball screw, comprising:
    a base, a linear guide rail fixed to the base, a rigid-flexible coupling platform, a servo motor, the ball screw, a guide rail sliding block, a displacement sensor and a driving controller;
    wherein the rigid-flexible coupling platform comprises a frame and a workbench; and the frame and the workbench are connected through a flexible hinge;
    the servo motor is configured to drive the ball screw;
    the workbench is connected with the ball screw;
    the frame is connected with the linear guide rail by the guide rail sliding block;
    the displacement sensor is configured to feed back a position of the workbench;
    the driving controller is configured to take a planned trajectory as a control target, to form a position loop with the position feedback of the workbench, to form a speed loop with a speed of the servo motor, and to generate a control signal to a current loop to drive the ball screw to drive the workbench to move;
    the flexible hinge is a spring leaf; the workbench and the spring leaf are connected together by a middle pressing block; and both ends of the spring leaf are pressed together with the frame through two end pressing blocks respectively;
    the middle pressing block is replaceable with a pressing block of a different width; and
    pressing positions of the end pressing blocks are changeable.

2. A rigid-flexible coupling motion platform driven by a ball screw, comprising:
    a base, a linear guide rail fixed to the base, a rigid-flexible coupling platform, a servo motor, the ball screw, a guide rail sliding block, a displacement sensor and a driving controller;

wherein the rigid-flexible coupling platform comprises a frame and a workbench; and the frame and the workbench are connected through a flexible hinge;

the servo motor is configured to drive the ball screw;

the workbench is connected with the ball screw;

the frame is connected with the linear guide rail by the guide rail sliding block;

the displacement sensor is configured to feed back a position of the workbench; and the driving controller is configured to take a planned trajectory as a control target, to form a position loop with the position feedback of the workbench, and to form a speed loop with a speed of the servo motor; with a purpose of converting a position of the servo motor into a linear displacement, the position feedback of the workbench is serviced as an actual position, a position deviation and a control signal are taken as inputs to perform an expanded state observation of disturbance estimation and the estimated disturbance is used to modify the control signal; and then the control signal is input to a current loop to drive the ball screw to drive the workbench to move.

3. The rigid-flexible coupling motion platform according to claim 2, wherein the flexible hinge is a spring leaf; the workbench and the spring leaf are connected together by a middle pressing block; and both ends of the spring leaf are pressed together with the frame through two end pressing blocks respectively;

the middle pressing block is replaceable with a pressing block of a different width; and pressing positions of the end pressing blocks are changeable.

4. A method for controlling a rigid-flexible coupling motion platform driven by a ball screw, wherein the rigid-flexible coupling motion platform comprises a base, a linear guide rail fixed to the base, a rigid-flexible coupling platform, a servo motor, the ball screw, a guide rail sliding block, a displacement sensor and a driving controller;

the rigid-flexible coupling platform comprises a frame and a workbench; and the frame and the workbench are connected through a flexible hinge;

the servo motor is configured to drive the ball screw;

the workbench is connected with the ball screw;

the frame is connected with the linear guide rail by the guide rail sliding block;

the displacement sensor is configured to feed back a position of the workbench;

the driving controller is configured to control the ball screw to drive the workbench to move;

the method comprises: a semi-closed loop control mode, a dual-feedback full-closed loop control mode, and a dual-feedback auto disturbance rejection control mode;

in the semi-closed loop control mode, a planned trajectory is taken as a control target, a position loop is formed with a position feedback of the servo motor, a speed loop is formed with a speed of the servo motor, and a control signal is input to a current loop to drive the ball screw to drive the workbench to move;

in the dual-feedback full-closed loop control mode, a planned trajectory is taken as a control target and a position loop is formed with the position feedback of the workbench; a speed loop is formed with a speed of the servo motor, and a control signal is input to a current loop to drive the ball screw to drive the workbench to move;

in the dual-feedback auto disturbance rejection control mode, a planned trajectory is taken as a control target, a position loop is formed with the position feedback of the workbench, a speed loop is formed with a speed of the servo motor, with a purpose of converting a position of the servo motor into a linear displacement, the position feedback of the workbench is serviced as an actual position, a position deviation and a control signal are taken as inputs to perform the expanded state observation of disturbance estimation and the estimated disturbance is used to modify the control signal; and then the control signal is input to a current loop to drive the ball screw to drive the workbench to move.

5. The method according to claim 4, wherein when precision is required in micron scale, the semi-closed loop control mode is adopted;

when the precision is required in sub-micron scale, the dual-feedback full-closed loop control mode is adopted; and when the precision is required in nanoscale, the dual-feedback auto disturbance rejection control mode is adopted.

6. The method according to claim 5, wherein in the micron scale, the precision is greater than 1 μm;

in the sub-micron scale, the precision is in a range of 0.1-1 μm; and in the nano scale, the precision is less than 0.1 μm.

* * * * *